US008706533B2

(12) United States Patent
Mehl et al.

(10) Patent No.: US 8,706,533 B2
(45) Date of Patent: Apr. 22, 2014

(54) TRAVEL PASSENGER CHECK-IN (75) Inventors: Thomas Walter Heinrich Mehl, Brooklyn, NY (US); Eric Allan Frome, Farmington, MN (US); Divish Priya Ranjan, Austin, TX (US); Rosalie Mack Phillips, Eagan, MN (US); Seth Aaron Horowitz, Salt lake City, UT (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/550,755

(22) Filed: Aug. 31, 2009

(65) Prior Publication Data

US 2011/0054953 A1  Mar. 3, 2011

(51) Int. Cl.
*G06Q 10/00* (2012.01)

(52) U.S. Cl.
USPC ................ 705/5; 705/1.1; 705/7.11

(58) Field of Classification Search
USPC ............... 705/1.1, 5–6, 7.11–7.36, 400–418
See application file for complete search history.

(56) References Cited

U.S. PATENT DOCUMENTS

| 2007/0061182 | A1 | 3/2007 | Brooks et al. | |
| 2007/0226680 | A1* | 9/2007 | Kumhyr et al. | 717/102 |
| 2008/0010375 | A1* | 1/2008 | Coleman et al. | 709/225 |
| 2010/0293386 | A1* | 11/2010 | Kezzou et al. | 713/176 |

FOREIGN PATENT DOCUMENTS

| WO | WO0038091 A1 | 6/2000 |
| WO | WO0163533 A9 | 2/2004 |
| WO | WO 2006029639 A1 * | 3/2006 |

OTHER PUBLICATIONS

Mimi, KLM Internet Check-In, Jun. 1, 2008, http://www.sleeplessinkl.com/2008/06/01/klm-internet-check-in retrieved Sep. 30, 2010.*
Cheapflights.com, Airline Upgrade Guide, http://replay.web.archive.org/20080513045242/http://www.cheapflights.com/travel-tips/airline-upgrade-guide, May 13, 2008, retrieve Apr. 19, 2011.*
David Joachim, "Air Power", Network Computing: Apr. 17, 2003, p. 32-42.*
Common Use Self Service Implementation Guide, IATA, http://www.iata.org/whatwedo/stb/Documents/CUSS-ImpGuide-2ndEd-Dec2008.pdf, dated Dec. 31, 2008, retrieved Sep. 3, 2013.*
European Search Report for Application No. 10 00 8001 dated Jun. 29, 2011, 5 pages.
Office Action in co-pending Australian Application No. 2010206068 issued May 30, 2013, 3 pages.
Patent Examination Report No. 2 in co-pending Australian Application No. 2010206068, issued Sep. 16, 2013, 3 pages.

* cited by examiner

*Primary Examiner* — George Chen
(74) *Attorney, Agent, or Firm* — Fish & Richardson P.C.

(57) ABSTRACT

This document describes a computer-implemented method for guiding a user through a travel check-in procedure. The method includes receiving passenger identification information associated with a passenger checking in for a travel segment, and determining a check-in status of the passenger using the passenger identification information. The method also includes generating a check-in workflow based on the check-in status of the passenger. The method further includes providing for display on a user interface a current step in the check-in workflow, the current step corresponding to a current action in the check-in workflow to be completed by a user, and upon request of the user to continue to a next step in the workflow, providing for display on the user interface the next step in the check-in workflow, the next step corresponding to a next action in the check-in workflow to be completed by the user.

19 Claims, 7 Drawing Sheets

SERVICES

Passenger: Smith, John    Record: D5K9PM    Segment: 1    To: SLC to DEN Current Services
1. Premium Meal    $7.50   Paid
2. Movie Rental    $2.25   Paid
3. Seat Upgrade    $15.00   Unpaid

[Remove] [Modify]

Additional Services
1. First Class Upgrade    $60.00

[Add]

Service Options
1. Pasta
   Chicken
   Vegetarian
2. Step Brothers
   Last Goodbye

[Select] [Modify]

Tabs: SEARCH F2 | SEATS F3 | BAGS F4 | SERVICES F5 | PAYMENTS F6 | SUMMARY F10

[< Previous] [Next >]

TRAVEL PASSENGER CHECK-IN

TECHNICAL FIELD

This document relates to systems and techniques for checking in travel passengers.

BACKGROUND

Travel services, such as airlines, buses, trains, boats, and the like often use procedures for checking in passengers prior to departure. For instance, at an airport, a ticket agent for a particular airline may run through a number of different steps, such as checking baggage, offering optional services or upgrades, collecting payments, and printing boarding passes, for example. These check-in procedures are often computerized, and may be displayed to ticket agents in a number of different forms, including via a text-based keyboard and command-driven format or via a graphical user interface (GUI) that may typically utilize user input devices such as a keyboard and a mouse for entry of information.

The check-in procedures may be time-sensitive as travel providers want to check in passengers as quickly as possible to avoid long lines or other backups at the point of departure. Highly-skilled, experienced check-in agents can use the text-based keyboard and command-driven interface very quickly and efficiently to check in travel passengers. On the other hand, travel providers also want to provide a high level of service and check-in accuracy for their passengers, even with less-experienced check-in personnel. The GUI format for checking in passengers is often easier and more intuitive, but is traditionally slower than checking passengers in using the text-based approach. These considerations may therefore be at odds, requiring the travel provider to strike a balance between speed and customer service.

SUMMARY

This document describes systems and techniques that may be used to intelligently guide a user through a series of steps related to passenger check-in. In general, the system determines on a per-passenger basis which check-in steps are required, optional, or disabled. It also determines a logical and efficient order in which the check-in steps should be completed by a user. The system then provides a GUI that guides the user through the steps. As the user works through the steps, the process flows may be updated to adjust to changing conditions.

In certain implementations, such systems and techniques may provide one or more advantages. For example, the check-in procedures may be configurable for different travel providers such that they may implement their own logic that is appropriate for their particular check-in procedures. Also, the check-in processes may fully integrate various steps of the check-in procedure and organize them into a logical workflow that may intuitively guide even relatively novice users through the check-in process, resulting in faster check-in processing times.

In one implementation, a computer-implemented method for guiding a user through a travel check-in procedure is described. The method includes receiving passenger identification information associated with a passenger checking in for a travel segment, and determining a check-in status of the passenger using the passenger identification information. The method also includes generating a check-in workflow based on the check-in status of the passenger. The method further includes providing for display on a user interface a current step in the check-in workflow, the current step corresponding to a current action in the check-in workflow to be completed by a user, and upon request of the user to continue to a next step in the workflow, providing for display on the user interface the next step in the check-in workflow, the next step corresponding to a next action in the check-in workflow to be completed by the user.

In another implementation, a computer-implemented passenger check-in system includes an interface for a check-in workflow generation system configured to receive check-in status related to a passenger checking in to a travel segment. The system further includes a provider rules database storing configurable rules information associated with a travel provider. The system also includes a check-in workflow engine configured to generate a check-in workflow based on the check-in status of the passenger and the configurable rules information. The system also includes a display device configured to display a user interface showing a current step in the check-in workflow, the current step corresponding to a current action in the check-in workflow to be completed by a user, and upon request of the user to continue to a next step in the workflow, to display a user interface showing the next step in the check-in workflow, the next step corresponding to a next action in the check-in workflow to be completed by the user.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for generating a user interface configured to guide a user through a travel passenger check-in procedure. Such techniques may include determining the check-in status of a passenger (e.g., whether the passenger has already selected a seat assignment online, checked bags with an airport valet, etc.), identifying any additional check-in procedures that may need to be completed for the passenger, and providing a user interface that helps a user, such as a check-in agent, complete the check-in procedure. The user interface may be configured to intelligently guide the user through the check-in procedure in a number of different ways, as described in further detail below.

A typical check-in workflow for travel passengers in the airline industry, for example, may have several different check-in steps. Some check-in workflows may include one or more steps related to searching for passenger information, assigning seats, handling baggage, adding optional services, receiving payments, and/or finalizing the passenger check-in.

It should be understood that many of these steps may be interrelated, and may occur in a different order or may be left out of the check-in procedure. In addition, certain travel providers may use different check-in procedures that are specifically tailored to their own processing steps.

As an example of a passenger search step, a check-in agent may enter passenger identification information to locate a particular passenger's travel itinerary to begin the check-in process. The passenger identification information may take several different forms, but may include a passenger name, credit card information, a record locator, flight information, etc. In a seat assignment step, the check-in agent may assign a seat to a passenger or may modify an existing seat assignment to ensure that the passenger is seated in a particular desired seat location or section. In a baggage handling step, the passenger may be allowed to check one or more bags at the check-in counter. In an optional services step, a passenger may be offered various options for the flight, such as a seat upgrade, an in-flight movie, meal services, etc. In a payment step, the passenger may provide payment for the segment or additional services, including for example, checking an oversized bag or upgrading a seat to first class. After all of the other check-in procedures have been completed, a finalization step may be provided to complete the check-in process.

The systems and techniques described herein provide a way of presenting these, or other various check-in steps to a user, such as a check-in agent. In certain implementations, such as a self check-in kiosk for example, the user may be a passenger who is responsible for checking in to the travel segment rather than a check-in agent. Regardless of the user, the check-in steps are displayed and processed intelligently rather than in a static manner. For instance, rather than just providing each of the check-in steps in the same order and in the same manner, the system may analyze various passenger parameters (e.g., check-in steps that have already been completed; whether the passenger has particular seating preferences, etc.) and other parameters (e.g., the length of the check-in lines at the terminal, the on-time status of the departure, etc.), and provide a check-in procedure that is tailored to the passenger checking in and to the other parameters relating to check-in.

The rules that are used to determine the tailored check-in procedure may be configurable by each individual travel provider in order to suit their own particular needs. For example, some travel providers may have a rule that, if the passenger has already been assigned a seat, the seating step is always skipped to save time on check-in. Other travel providers may have a rule that the seating step must always be visited in order to ensure that the passenger does not want to change his or her seat during check-in. And other travel providers may determine automatically if a passenger is satisfied with his or her pre-assigned seat, such as by comparing the assigned seat to the passenger's preferences, and may only include the seating step in their check-in procedure if the passenger might be dissatisfied with the pre-assigned seat. This and other examples are merely provided as possible check-in workflow configurations that certain travel providers may utilize, and are not meant to limit the scope of this disclosure.

Figure 1:
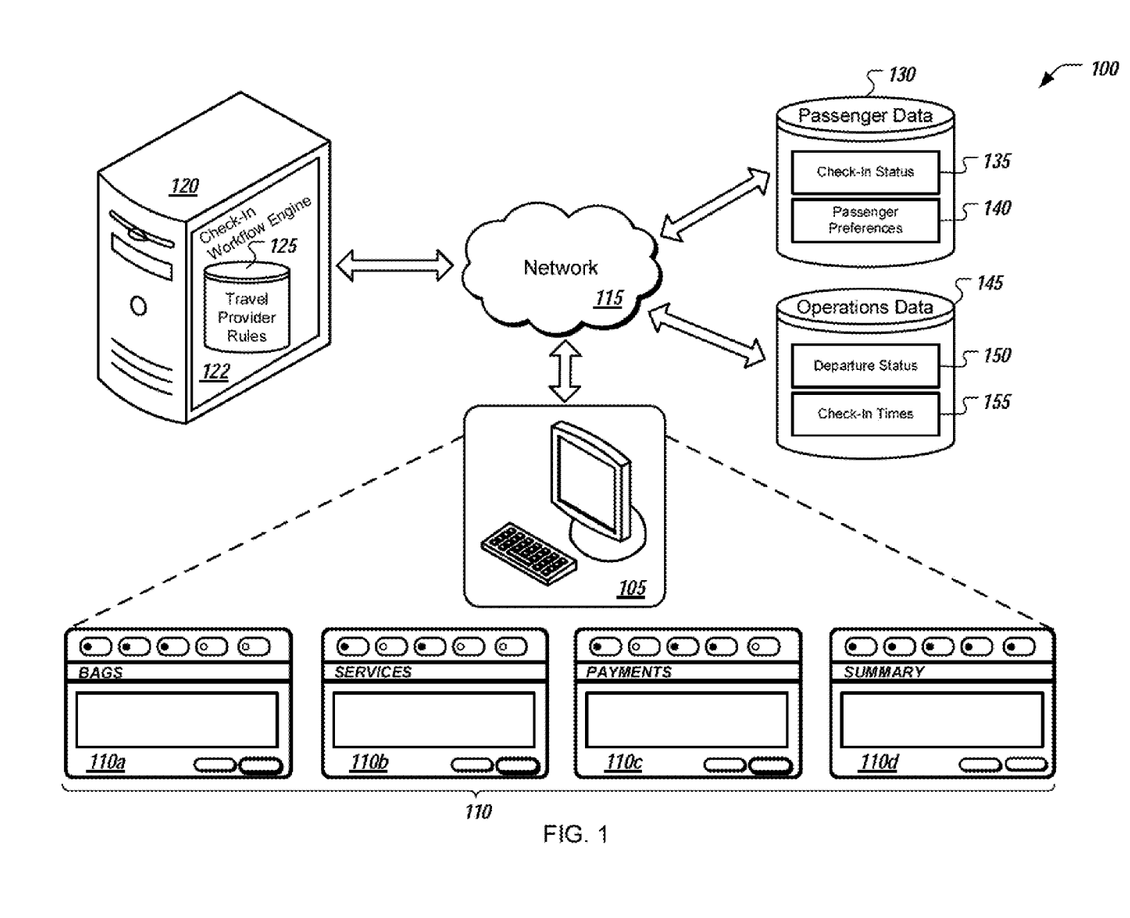
FIG. 1 is a conceptual diagram of a passenger check-in system.

FIG. 1 is a conceptual diagram of an example passenger check-in system 100. The system 100 as shown includes a user workstation 105 capable of providing a user interface 110 to a user. In some implementations, the user interface 110 may include a number of different check-in screens 110*a-d* that may be presented to the user in a particular order. For example, the screens may be presented in series as part of a check-in workflow. As shown, screen 110*a* may relate to a step for checking in bags, screen 110*b* may relate to a step for adding optional services, screen 110*c* may relate to passenger payments, and screen 110*d* may relate to a finalization or summary screen. Each of the different screens may relate to a different step in a check-in workflow, or may include multiple steps in the workflow. Alternatively, multiple screens may be used to present a single workflow step to the user.

The user interface 110 may also use different graphical interface concepts to display steps of the check-in workflow to a user of the system 100. For example, rather than using multiple screens, a single screen may be used. In some implementations, a single screen may include various tabs that a user may select to move to a different step in the process. In other implementations, a single screen may include various sections that are related to the steps in the check-in process.

The user workstation 105 may be communicably coupled to a number of components of the system 100, such as via a network 115. The network may be made up of any appropriate communications channels, either alone or in combination, such as the Internet, a local area network (LAN), a wide area network (WAN), a wired or wireless network, or the like. Other components of the system 100 may include a workflow server 120, a passenger database 130, and/or an operations database 145, for example.

The workflow server 120 may host a check-in workflow engine 122 configured to generate and update check-in workflows based on various inputs, conditions, and rules. The workflow engine 122 may reference travel provider rules 125 that describe how their particular user interfaces and workflows should be generated. For example, some travel providers may not allow seat assignments to passengers, and instead may employ open boarding procedures on a first-come first-served basis. For these travel providers, seat assignment procedures would likely not be included in their user interfaces or check-in workflow. As another example, even providers who use the same number and type of steps for check-in may determine that a particular step that occurs second in another provider's workflow makes more sense placed fourth in their own procedures. The travel provider rules 125 allow each provider to configure rules that are most effective for their own particular check-in procedures.

One of the inputs to the workflow server 120 may include information relating to the passenger checking in, which may be stored, for example, in the passenger database 130. The passenger database 130 may include information relating to passenger check-in status 135, passenger preferences 140, or other passenger information. Additional examples of passenger information may include other travel segments that have been booked for the passenger, whether the passenger is a member of a frequent traveler program, and if so, the status level of the passenger within the program, and the like.

Another input to the workflow server 120 may include information relating to the departure terminal, which may be stored, for example, in the operations database 145. The operations database 145 may include such information as departure status 150 relating to whether particular departures are on-time or delayed, check-in times 155 related to how long the lines are at the check-in terminals, and other operations related information. Additional examples of such information may include marketing promotions from local businesses or any other information that may affect the check-in procedures used for that particular terminal.

The workflow server 120 may be configured to aggregate information from these inputs or others to generate an optimized workflow procedure for checking in passengers. The workflow procedure may be generated on a per-passenger basis such that it takes into account differences in the check-in status of the passengers, passenger preferences, etc. The check-in workflow procedure may also be tailored to the current situation—for example, the length of the check-in lines at the terminal. The generated workflow procedure may then be presented to a user via the user workstation 105.

In the example shown in FIG. 1, screens 110a-d represent an example workflow that begins with a baggage check-in screen 110a, continues to a services screen 110b, then moves to a payments screen 110c, and then to a summary screen 110d. The user may indicate a desire to move to the next screen in the workflow by, for example, clicking a Next or Continue button, pressing an Enter key, or by any other appropriate interface command. After receiving such an indication from the user, the user interface 110 may be updated to show the next appropriate step from the generated check-in workflow. In some implementations, each time the user chooses to move to the next screen, the check-in workflow is updated to account for any changes made at the previous step. This may cause a re-ordering of the check-in screens, depending upon the actions taken by the user.

In certain implementations, users may also choose to switch between screens outside the context of the generated check-in workflow. For example, in addition to a Next or Continue button as described above, each screen may have one or more buttons that directly link to other check-in screens. As such, even if the next step in the process as determined by the check-in workflow would normally be the Payments screen, a user may choose to go to the Bags screen by clicking on a Bags screen button. As another example, hotkeys or other commands may be used to directly access a particular screen that the user wishes to visit. If such action is taken by the user, the generated check-in workflow may be regenerated or updated to account for any changes made by the user outside the context of the normal workflow.

In some implementations, the check-in process using system 100 may proceed as follows. A passenger may approach a check-in agent using workstation 105, such as at a check-in desk at a departure terminal. The passenger may tell the agent his or her name or some other identification information, and the agent may enter the identification information into the workstation 105. Based on the identification information, the system 100 may identify the passenger's check-in status 135 relating to the steps that may be required to complete the check-in, and may feed the check-in status 135 to the check-in workflow engine 122. The check-in workflow engine 122 may query a set of travel provider rules 125, and generate an appropriate check-in workflow that the agent may follow to check in the passenger. These various steps may be provided for display on the workstation 105, and may be in the form of a series of check-in screens 110a-d. As each screen is completed, the agent may click on a Next button that represents to the system 100 that the agent is done with that step and wishes to move to the next step. The agent may then move through each of the screens in the order provided by the check-in workflow, and after completing the workflow, the passenger may be checked in for departure.

Figure 2:
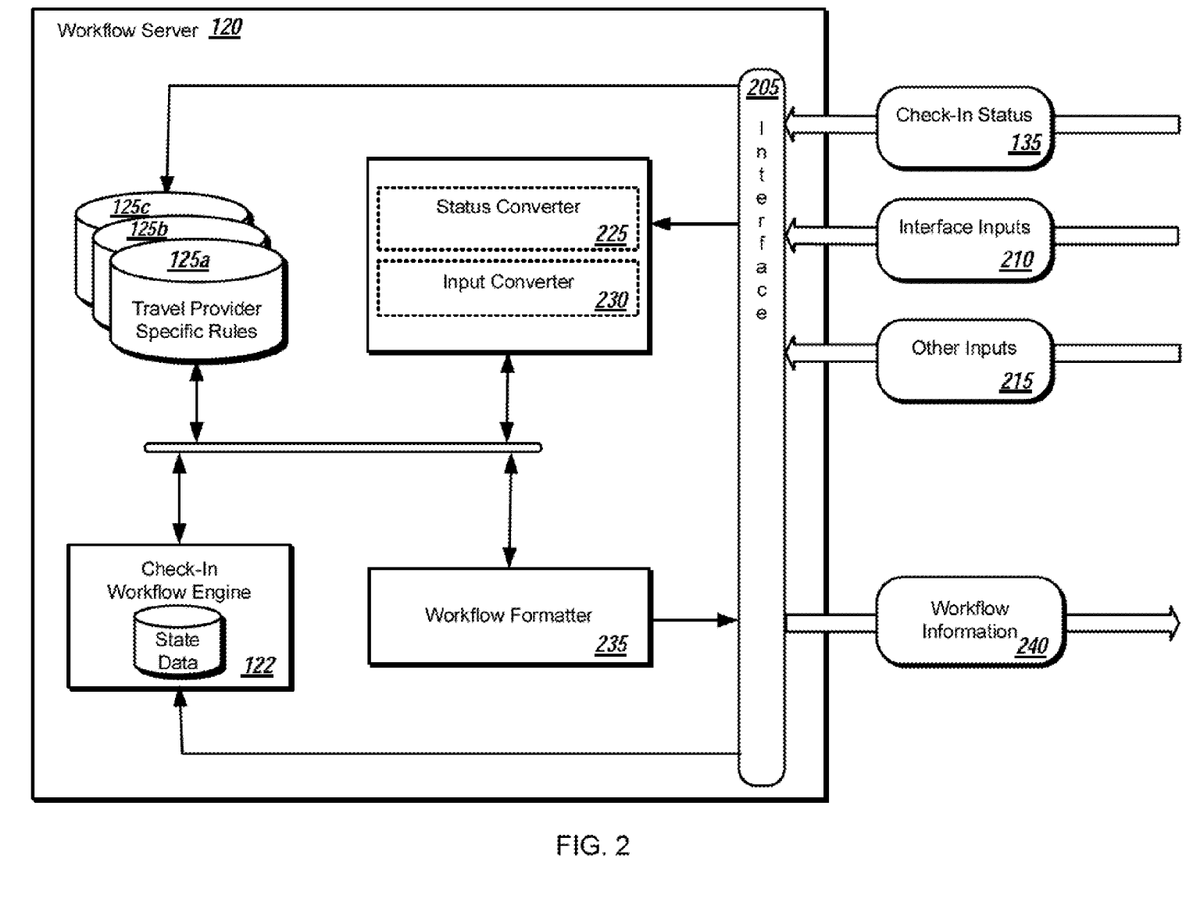
FIG. 2 is a block diagram of an illustrative check-in workflow generation system.

FIG. 2 is a block diagram of an illustrative check-in workflow generation system. The system may be hosted by a workflow server 120, or may be spread across multiple components of the system 100. Inputs to the workflow server 120 may include passenger check-in status 135, user actions 210 that relate to actions taken by a user of workstation 105, and various other inputs 215, such as inputs from an operations database 145 as described above. These inputs may be received by an interface 205 of the workflow server 120. The workflow server 120 may use these inputs to generate an appropriate check-in workflow, and to provide the workflow in the form of a check-in procedure that can be displayed via a user interface 110 to a user of a workstation 105. In some implementations, the workflow, or portions thereof, may be provided to other components of the system 100 by way of the interface 205.

One or more converters may also be included to convert inputs to the workflow server 120 into a standardized format. As an example, the workflow server 120 may serve multiple different travel providers, all of which may have their own different ways of representing passenger check-in status 135, interface inputs 210, or other inputs 215. A status converter 225 may identify which travel provider is providing the check-in status and use a conversion mechanism, e.g., a lookup table or the like, to translate the travel provider's specific check-in status 135 into a common status type used by the check-in workflow engine 122. As another example, certain travel providers may allow or use a number of different inputs to the system, which may be similarly converted by an input converter 230.

The workflow server 120 may include a number of different rules databases 125a-c, which may each relate to the specific rules for a particular travel provider. Alternatively, databases 125a-c may be combined into a single database that includes rules for all of the travel providers that are serviced by the workflow server 120. The travel provider specific rules 125a-c may be configurable during a setup phase, and may be changed over time as the travel providers change their desired check-in operations.

The travel provider specific rules may be set up to include rules relating to various check-in procedures and may essentially define the check-in workflows for any number of different situations. For example, as described above, an airline may not have seat assignments, and may instead use a first-come first-served boarding format. This particular travel provider may have a set rule that a seat assignment page is never shown to a check-in agent because seat assignments are not an option in that particular check-in process. As another example, a train check-in procedure may be sped up in certain situations when the terminal check-in lines are becoming too long, such as by disabling an optional services screen until the lines become more manageable. Since the optional services screen may not be necessary for the check-in procedure, it may be skipped if the travel provider chooses to sacrifice the chance to offer such services in order to improve the times for checking passengers in.

In implementations where the rules are travel provider specific, as shown in rules databases 125a-c, each travel provider may decide what is important to its own check-in procedures, and may also decide the appropriate order for various check-in steps to be presented to a check-in agent. The definition of appropriate rules may be separate and independent for each different travel provider. For example, some providers may find that their check-in processes work more efficiently when the baggage check-in step is presented before an optional services step, while other providers may determine that the steps should be reversed. In some implementations, a single travel provider may have multiple sets of rules.

The workflow server 120 may also include a check-in workflow engine 122 that is configured to generate and update check-in workflows on a per-passenger basis. In certain implementations, the check-in workflows may also be generated and updated based on various conditions occurring during, or contemporaneously with, the check-in procedures. In some implementations, the check-in workflow engine 122 may include a set of default rules that may be used in the case where one or more travel provider specific rules 125a-c are not determinative of a particular situation.

The check-in workflow engine 122 may include a state database that tracks the state of various check-in related steps in the process. For example, a number of the steps may be considered required steps, such that the check-in may not be completed until the required step has been completed. Other steps may be considered optional steps, such that the check-in may be completed without the user visiting the optional screens, but the optional screens are available to be visited during the check-in procedure. Other steps may be considered disabled or inactive steps, such that the screens are not made available to the user during the check-in procedure.

Additional state information may include whether a particular step has been visited by the user (e.g., whether the user has visited an optional screen) and/or whether a particular step has been completed. Whether a particular step has been completed may be dependent upon the travel provider specific rules 125a-c and the actions that have been taken by the user related to that particular step.

Each of these states may independently change during the check-in procedures, depending on the actions of the user. For example, as each step is visited and/or completed, the state information for that step may be updated to reflect such changes. As another example, as interface inputs 210 are received from a user, one or more of the steps may become required or enabled (e.g., if a customer adds a service that requires payment, a payment screen that may have been previously disabled because no payment was due may become enabled and required before the check-in may be completed). Other state changes are also possible depending on the actions of the user and how the travel provider wishes to handle such actions.

The workflow server 120 may also include a workflow formatter 235 that may be used to provide appropriate workflow information 240 to other components of the system 100. In some implementations, the workflow formatter 235 may be used to format various check-in workflow procedures as user interfaces that may be presented to the user. In other implementations, the workflow formatter 235 may identify certain portions of the workflow to be sent to various components of the system 100. For example, if the state of a particular step has been updated from incomplete, required to completed, the workflow formatter 235 may be used to identify such a change in the user interface, such as by changing a visual indicator related to the state of the particular step.

Figure 3:
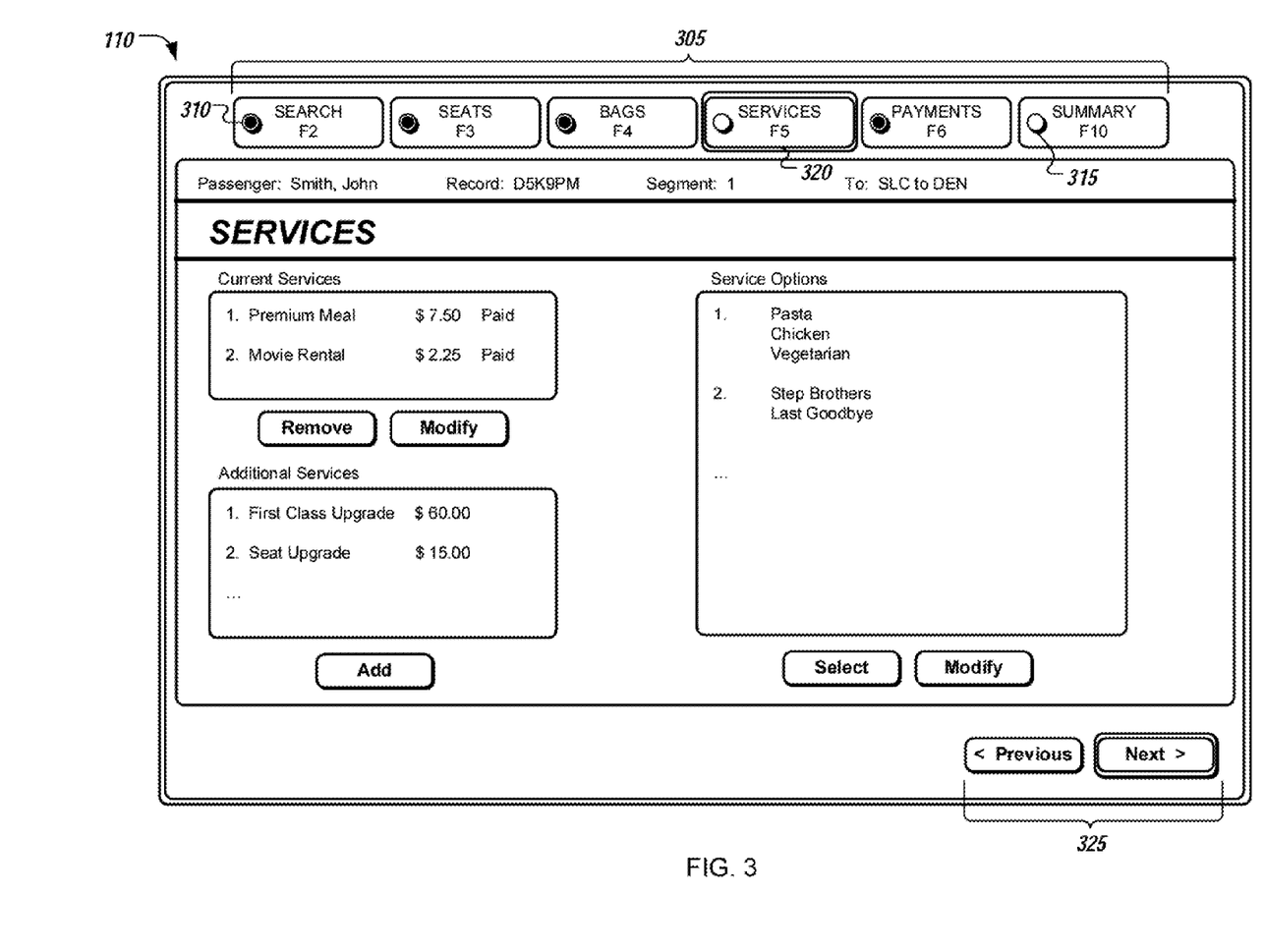
FIGS. 3 and 4 are example screen shots of a user interface for a portion of a check-in procedure.

FIG. 3 is an example screen shot of a user interface for a portion of a check-in procedure. The user interface may include a number of different user interface input and output options that allow a user to complete the passenger check-in processes as described herein. In some implementations, the user interface may be a graphical user interface (GUI) that includes a number of different screens, buttons, input boxes, textual displays, etc.

In some implementations, the user interface 110 may include a set of screen buttons 305 or links across the top of the screen, with each button relating to a different step or group of steps in a check-in workflow, or a different screen, etc. As shown in interface 110, the screen buttons 305 may include indicators 310, 315 that show the state of a particular step, indicating whether the particular step is required, optional or disabled, and/or whether the step is complete or incomplete, etc. For example, an indicator 310 showing a filled-in circle may relate to a step that has already been completed by the user, while an indicator 315 showing an empty circle may relate to a step that is incomplete. In other implementations, the indictor may be a colored indicator, such as green for a completed step, yellow for an optional incomplete step, or red for a required incomplete step, for example. The button 320 corresponding to the current step in the process may be highlighted, such as by including a visual border or outline around the button, or by some other visual indication on the interface.

The screen buttons may also be associated with a related hotkey or other command that allows a user to switch to that particular screen or step from anywhere in the workflow. As shown in the example screen shot, the Seats screen is accessible by pressing the F3 button on a keyboard. Similarly, the user may be able to click on the button using a mouse or other input device to indicate a desire to jump to the particular screen corresponding to the screen button. In some implementations, this may allow a check-in agent to jump to any available step in the process at any point in the check-in process. As described below, this may cause the check-in workflow to be updated to account for the user's actions.

The user interface 110 may also include buttons 325, such as Previous and Next buttons for proceeding to the previous or next steps in the check-in workflow respectively. If a user clicks the Next button, for example, the user interface may be updated to show the next step in the check-in workflow. Similarly, the Next button may be defaulted on the interface such that if the user presses an Enter key on a keyboard, the Next button will be triggered and the next step in the check-in workflow will be shown on the interface. In some implementations, the Next button will cause the check-in workflow to be updated, and the next step in the updated check-in workflow to be displayed via the interface.

The user interface 110 may also include various action items that the user may interact with for checking in a passenger. As shown in the example user interface for optional services, the user may be allowed to remove or change current services for the passenger, add additional services for the passenger, and/or select or modify various service options relating to the passenger's services. Such interactions by the user may affect the check-in workflow relating to the current passenger, depending on the type of interaction that occurs. This updating of the check-in workflow is described in further detail below.

Figure 4:
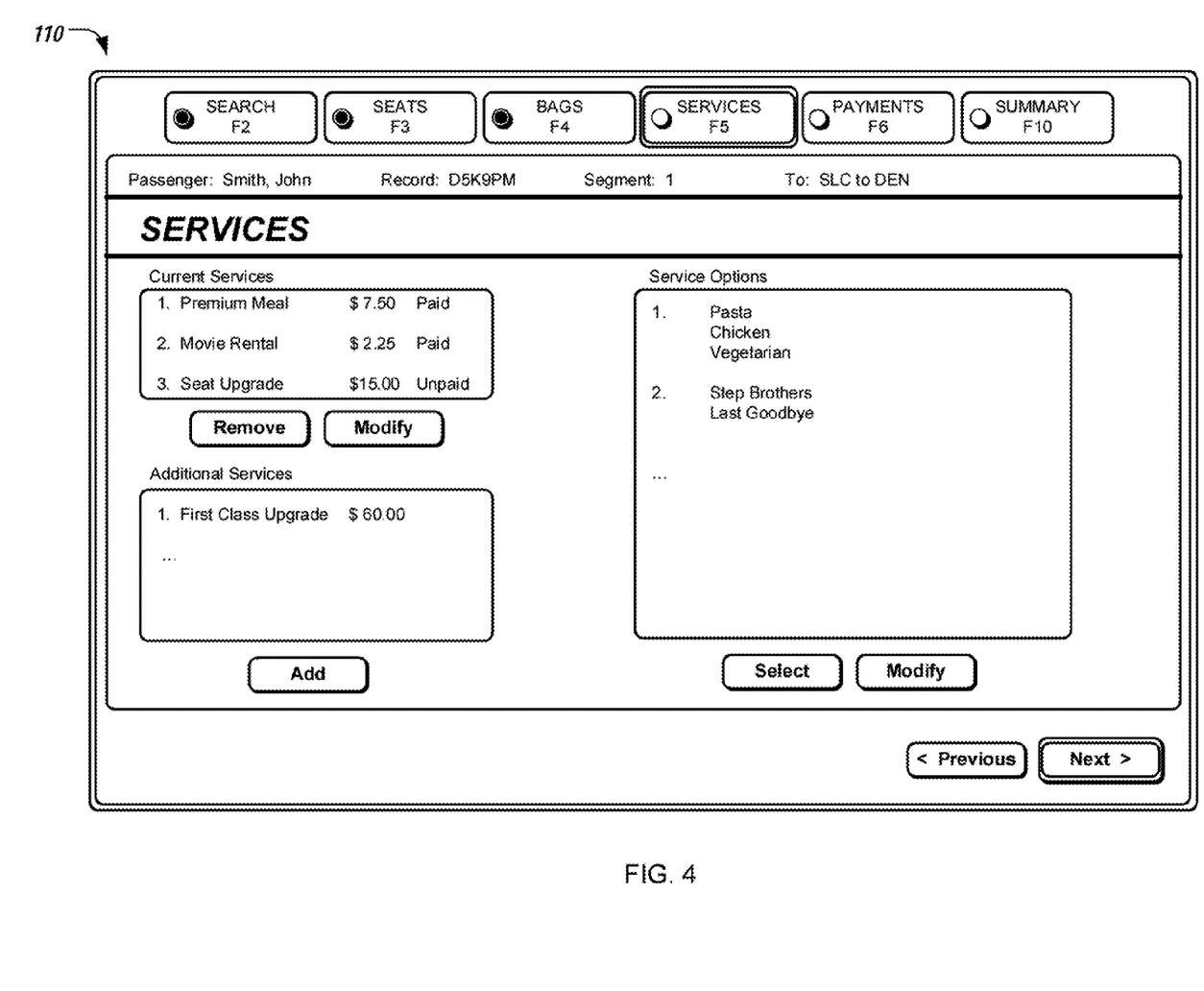

FIG. 4 is another example screen shot of a user interface for a portion of a check-in procedure, and illustrates check-in workflow changes that may occur during passenger check-in. As shown in the example screen shot, which is a continuation of the previous screen shot from FIG. 3, the user added the optional Seat Upgrade service to the passenger's current services. In this particular case, the Seat Upgrade service requires a fee of $15.00, which the passenger has not yet provided. Since the newly added service has not yet been paid for by the passenger, the check-in workflow may be adjusted to now require the user to complete the Payments page before check-in can be completed. This may be indicated to the user as described above, such as by changing the indicator for the Payments button to be an empty circle, whereas before, it was a filled-in circle because the passenger had already paid for his services of a Premium Meal and Movie Rental.

In addition to the visual changes on the interface, the overall check-in workflow may also be updated to reflect the actions taken by the user in adding the Seat Upgrade service. For example, when the user added the service, the input to the user interface may have triggered an update to the workflow server 120 that may in turn trigger an update to the check-in workflow. In this example, the addition of a new service may change the Payments step from a completed step to a required, incomplete step, and the check-in workflow may be adjusted such that the next logical step after completing the Services step is to proceed to the Payments step. However, if the user had not added the service, or had added the service but then removed it, the Payments step may have been a completed or disabled step because there would have been no payments due. Alternatively, even if the Payments step is changed to a required step, there may still be other steps that should precede the Payments step in the workflow, such that the Next button would not proceed to the Payments step, but to another step (e.g., the next logical step) in the workflow.

Figure 5A:
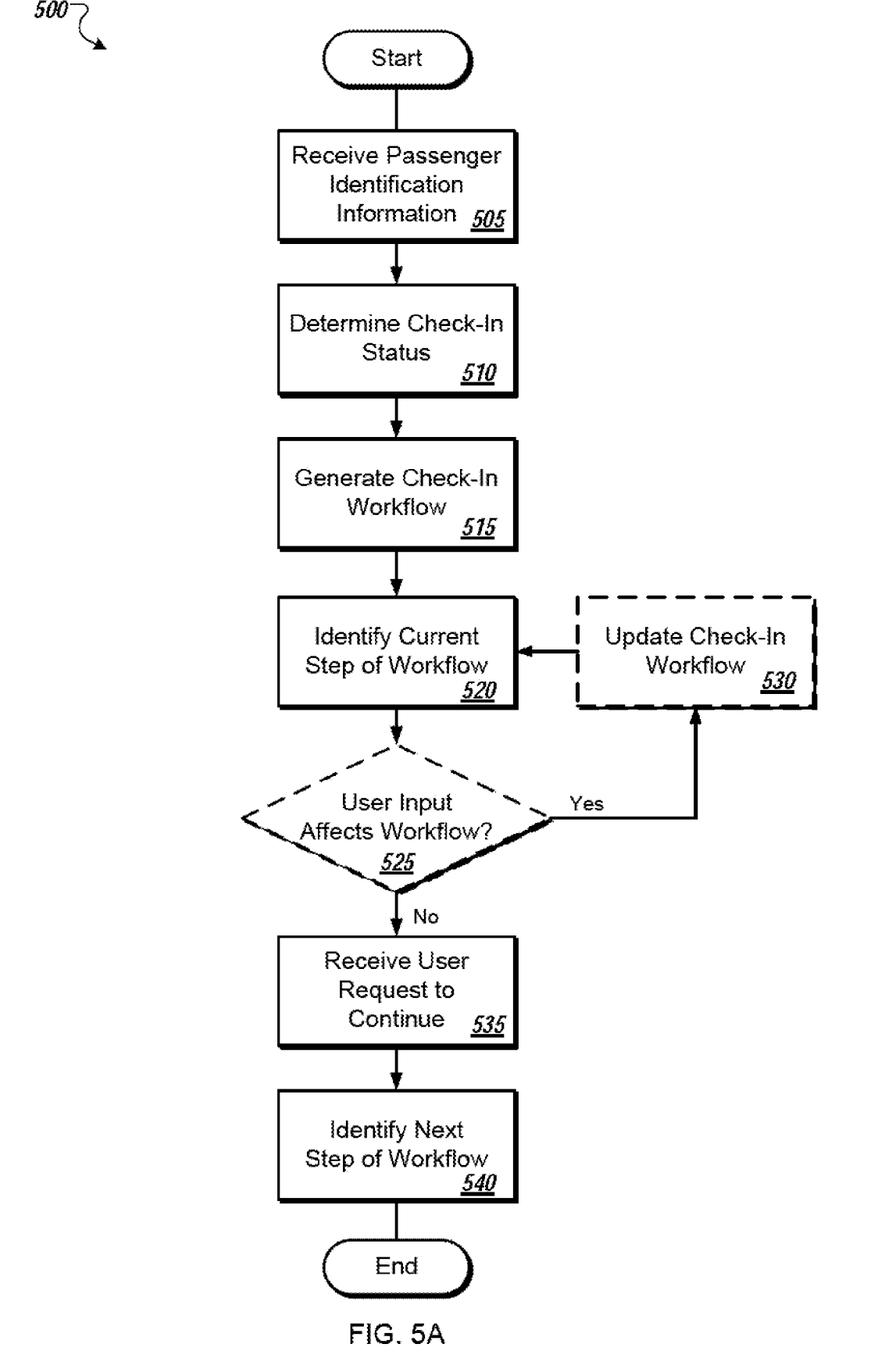
FIG. 5A is a flow chart of an example process for generating a check-in workflow.

FIG. 5A is a flow chart of an example process 500 for generating a check-in workflow. The process 500 may be performed, for example, by a system such as the previously described system 100. However, another system, or combination of systems, may be used to perform the process 500.

At block 505, the process 500 may begin by receiving passenger identification information, such as the passenger's name, credit card information, record locator, or other identifying information. For example, a passenger may approach a check-in agent using a check-in workstation, and may tell the agent his or her name or flight information, and the check-in agent may type the information into the workstation. Alternatively, a passenger may swipe a credit card at a kiosk to identify himself to the system. The passenger identification information may be used in block 510 to determine the check-in status of the passenger (e.g., whether the passenger has already selected a seat assignment online, checked bags with an airport valet, etc.).

At block 515, a check-in workflow that is tailored to the passenger checking in is generated by the system, according to the techniques described herein. The check-in workflow may identify a set of check-in steps that may be required, optional, or disabled during a check-in procedure, and it may also include a logical order for those particular check-in steps to be completed. In some implementations, the check-in status of the passenger is used to generate the check-in workflow—e.g., if a passenger has already selected a seat online, the check-in workflow may determine that a seat assignment step is optional. As described above, the generated check-in workflow may also depend on a travel provider's specific rules relating to check-in procedures. In addition, other inputs may also be considered in generating the check-in workflow, such as travel conditions at the terminal, flight status, etc. The check-in workflow may identify any additional check-in procedures that may need to be completed for the passenger before check-in is finalized.

A current step of the check-in workflow is identified at block 520. If the check-in workflow has just been generated, the current step may be the first logical step in the workflow. If the check-in workflow is updated during the procedure, the current step of the workflow may relate to where the user is in the process of completing the check-in procedure. In either case, the current step corresponds to the current action to be completed by the user, as determined by the check-in workflow.

At optional block 525, the system may determine whether any user input has affected the check-in workflow. In some implementations, any action by a user may cause the check-in workflow to be updated. In other implementations, only actions by the user that actually affect the workflow in some recognizable manner (e.g., by changing the state of one of the steps in the workflow) will cause an update to the check-in workflow. The optional block 530 shows the check-in workflow being updated if the user input affects the check-in workflow. As an example, if the user requests to add an optional service that requires additional payment, the check-in workflow may be updated to include a payment screen as a newly required screen before the check-in can be completed. Following the update, the system may again need to identify the current step of the workflow 520 as described above.

If no changes have affected the workflow, or in implementations where such changes are not identified in this stage of the process, block 535 represents a request by the user to continue the workflow check-in process. For example, the user may press an Enter key or may click a Next button on the user interface indicating that the user wishes to move to the next step of the check-in. Upon receiving such input from the user, block 540 shows that the next step of the workflow may be identified. The next step of the check-in workflow may correspond to the next logical step to be completed by the user as determined by the check-in workflow.

Figure 5B:
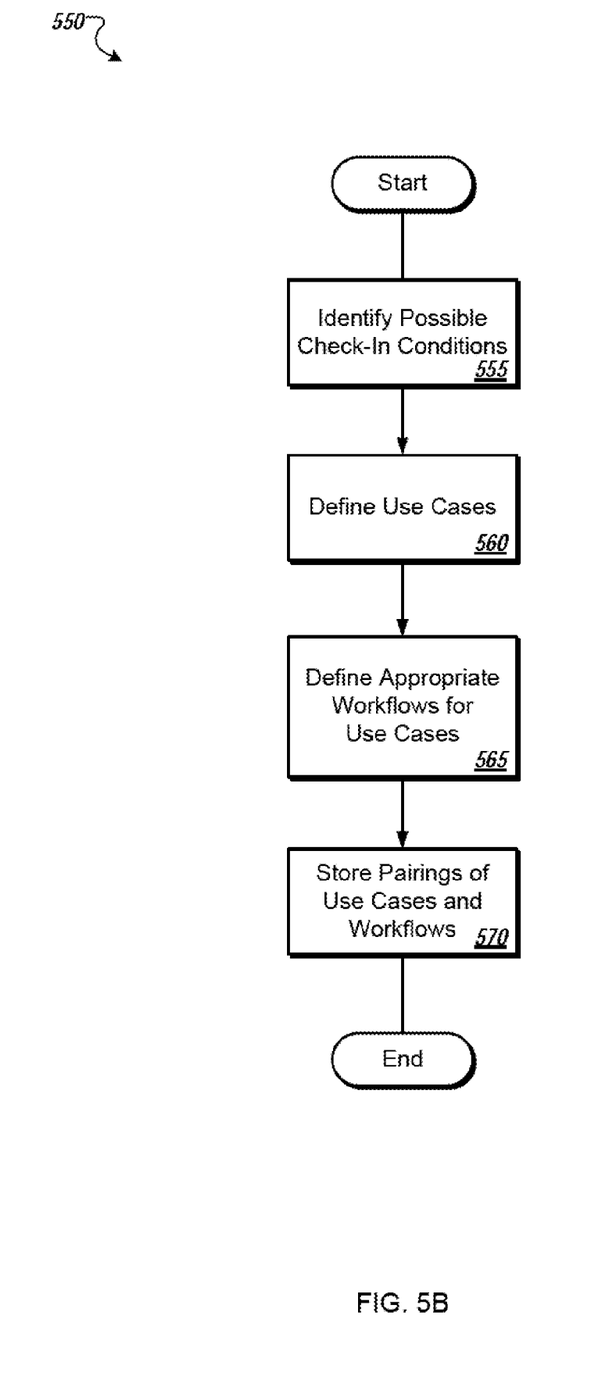
FIG. 5B is a flow chart of an example rules configuration process.

FIG. 5B is a flow chart of an example rules configuration process 550. This process is representative of the steps a travel provider may utilize in defining and storing various configuration rules related to generating an appropriate check-in workflow. As described above, the configuration rules serve to define how a particular check-in procedure for a travel provider is configured.

A typical configuration process for one or more defined check-in scenarios may proceed as follows. First, a configuration analyst may identify at block 555 one or more possible check-in conditions related to how the check-in workflow should be presented to the user. The range of check-in conditions included in this group may be as broad ranging or as narrow as desired, depending on how specific or "intelligent" the travel provider wishes the system to be. Although additional conditions may result in a better likelihood that the system will react appropriately in any given situation, the travel provider may determine that it is not worth identifying every single possible condition that should be taken into account. In certain implementations, a travel provider may determine the appropriate number and types of possible check-in conditions to provide coverage for, as an example, 90% of all check-in scenarios.

The next block 560 of the configuration process may be to define various use cases made up of combinations of one or more of the identified possible check-in conditions. For example, if the travel provider has determined that there are two important check-in conditions to track, and each of them have two or three different possible states or values, then the use cases may be defined to represent all possible permutations of the check-in conditions and the states of those conditions. In this example, one check-in condition may be whether the passenger has already checked in, and the possible values or states may be defined as either yes or no. Another possible check-in condition may be whether the passenger has indicated that he has bags to check in, and the possible values or states may be defined as no bags, 1 or 2 bags, or 3 or more bags. In this example, the different use cases may be defined as all possible permutations of the various conditions: e.g., (1) checked in with no bags; (2) checked in with 1 or 2 bags; (3) checked in with 3+ bags; (4) not checked in, and no bags; (5) not checked in, with 1 or 2 bags; or (6) not checked in, with 3+ bags.

In some implementations, the travel provider may define use cases for all possible check-in condition permutations, but only for valid combinations of those permutations. In the example above, the travel provider may not allow any bags to be indicated if the user has not yet checked in, so the possible permutations taking into account only valid combinations might be (1) checked in with no bags; (2) checked in with 1 or 2 bags; (3) checked in with 3+ bags; or (4) not checked in. In other implementations, the travel provider may only define rules for some subset of the valid check-in combinations.

At block 565, a check-in workflow for each of the defined use cases is defined, such as by creating a pairing linking the use case to the appropriate check-in workflow. As such, when the check-in conditions match (or substantially match) a particular use case, the check-in workflow matching that use case may be presented to a user according to the applicable use case/workflow pairing. At block 570, the use case/workflow pairings may be stored for later retrieval or lookup, such as by storing the information in a rules database 125*a*.

The check-in workflow in any given situation may therefore be dependent upon the situation as identified by a number of different check-in conditions and how the travel provider has defined its check-in procedures to be implemented when facing that particular situation.

Figure 6:
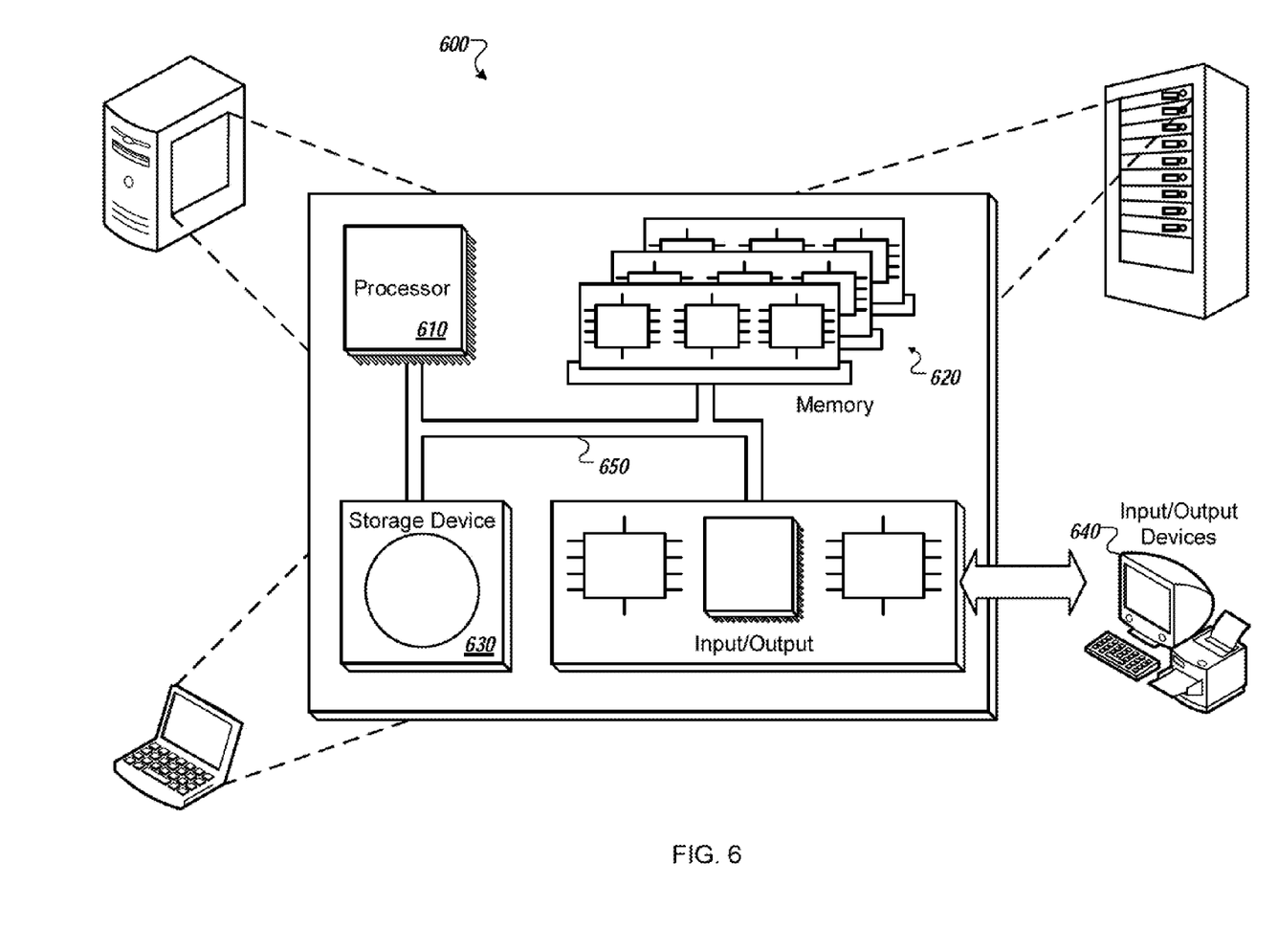
FIG. 6 shows an example of a computer device that can be used to implement the techniques described here.

FIG. 6 is a schematic diagram of a computer system 600. The system 600 can be used for the operations described in association with any of the computer-implement processes described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and process steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, much of this document has been described with respect to the airline industry, but other travel industry check-in procedures may also be addressed by the systems and techniques described herein. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method of guiding a user through a travel check-in procedure, the method comprising:
receiving, at a computer system, passenger identification information associated with a passenger checking in for a travel segment and travel provider information identifying a travel provider associated with the travel segment;
receiving, at the computer system, a travel provider formatted check-in status associated with the passenger;
converting the travel provider formatted check-in status to provide a check-in status of the passenger, the check-in status indicating one or more of whether the passenger has already selected a seat assignment online and whether the passenger has already checked bags;
selecting, from among multiple travel provider-specific rule sets that are stored for multiple different travel providers by the computer system, a set of rules that is specific to the identified travel provider;
dynamically generating, at the computer system, a check-in workflow that is tailored to the passenger and the check-in status of the passenger, using the selected set of rules that is specific to the identified travel provider;
providing for display on a user interface a current step in the check-in workflow, the current step corresponding to a current action in the check-in workflow to be completed by a user; and
upon request of the user to continue to a next step in the workflow, providing for display on the user interface the next step in the check-in workflow, the next step corresponding to a next action in the check-in workflow to be completed by the user.

2. The method of claim 1, wherein dynamically generating the check-in workflow comprises determining one or more check-in steps to be completed by the user to check in the passenger, wherein two more different passengers are associated with different check-in steps.

3. The method of claim 2, wherein dynamically generating the check-in workflow further comprises determining an order of the one or more check-in steps, wherein two or more different passengers are associated with different check-in step orders.

4. The method of claim 1 further comprising, upon receiving input from the user that affects the check-in workflow, updating the dynamically generated check-in workflow.

5. The method of claim 4, wherein the check-in workflow is affected if a state parameter corresponding to any step in the check-in workflow is modified.

6. The method of claim 1, wherein dynamically generating a check-in workflow comprises querying a check-in workflow rules engine using the check-in status of the passenger.

7. The method of claim 1, further comprising providing for display on the user interface an indicator relating to whether a step in the check-in workflow is a required step.

8. The method of claim 1, further comprising providing for display on the user interface an indicator relating to whether a step in the check-in workflow has been completed.

9. The method of claim 1, further comprising, upon request of a user to continue to a step in the workflow that is not the next step, providing for display on the user interface the requested step in the check-in workflow.

10. The method of claim 1, wherein dynamically generating a check-in workflow is also based on physical conditions at a check-in terminal at a time when the passenger is checking in.

11. The method of claim 1, wherein dynamically generating a check-in workflow is also based on preferences of the passenger that is checking in.

12. A computer-implemented passenger check-in system, comprising:
one or more computers having
an interface for a check-in workflow generation system configured to receive a travel provider formatted check-in status related to a passenger checking in to a travel segment and travel provider information identifying a travel provider associated with the travel segment;
a converter configured to convert the travel provider formatted check-in status to provide a check-in status of the passenger, the check-in status indicating one or more of whether the passenger has already selected a seat assignment online and whether the passenger has already checked bags;
a provider rules database storing multiple travel provider-specific rule sets for multiple different travel providers;
a check-in workflow engine configured to select a set of rules that is specific to the travel provider, and dynamically generate a check-in workflow that is tailored to the passenger and the check-in status of the passenger, using the selected set of rules that is specific to the travel provider; and
a display device configured to display a user interface showing a current step in the check-in workflow, the current step corresponding to a current action in the check-in workflow to be completed by a user, and upon request of the user to continue to a next step in the workflow, to display a user interface showing the next step in the check-in workflow, the next step corresponding to a next action in the check-in workflow to be completed by the user.

13. The system of claim 12 wherein the check-in workflow engine is further configured to update the dynamically generated check-in workflow upon receiving input from the user that affects the check-in workflow.

14. The system of claim 13, wherein the check-in workflow is affected if a state parameter corresponding to any step in the check-in workflow is modified.

15. The system of claim 12, wherein the dynamic generation of the check-in workflow is also based on physical conditions at a check-in terminal at a time when the passenger is checking in.

16. The system of claim 12, wherein the generation of the check-in workflow is also based on preferences of the passenger checking in.

17. A computer program product tangibly embodied in a non-transitory computer readable storage device, the computer program product including instructions that, when executed, perform operations for guiding a user through a travel check-in procedure, the operations comprising:
receiving, at a computer system, passenger identification information associated with a passenger checking in for a travel segment and travel provider information identifying a travel provider associated with the travel segment;

receiving, at the computer system, a travel provider formatted check-in status associated with the passenger;

converting the travel provider formatted check-in status to provide a check-in status of the passenger, the check-in status indicating one or more of whether the passenger has already selected a seat assignment online and whether the passenger has already checked bags;

selecting, from among multiple travel provider-specific rule sets that are stored for multiple different travel providers, a set of rules that is specific to the identified travel provider;

dynamically generating a check-in workflow that is tailored to the passenger and the check-in status of the passenger, using the selected set of rules that is specific to the identified travel provider;

providing for display on a user interface a current step in the check-in workflow, the current step corresponding to a current action in the check-in workflow to be completed by a user; and upon request of the user to continue to a next step in the workflow, providing for display on the user interface the next step in the check-in workflow, the next step corresponding to a next action in the check-in workflow to be completed by the user.

18. The computer program product of claim 17, wherein generating the check-in workflow comprises determining one or more check-in steps to be completed by the user to check in the passenger, wherein two or more different passengers are associated with different check-in steps.

19. The computer program product of claim 18, wherein generating the check-in workflow further comprises determining an order of the one or more check-in steps wherein two or more different passengers are associated with different check-in step orders.

* * * * *